(12) United States Patent
Kenemer et al.

(10) Patent No.: US 8,595,651 B2
(45) Date of Patent: Nov. 26, 2013

(54) SINGLE PAGE MULTI-TIER CATALOG BROWSER

(75) Inventors: Kerry D. Kenemer, Atlanta, GA (US); Robert S. Thompson, Smyrna, GA (US)

(73) Assignee: International Business Machines Corporation, Armonk, NY (US)

(*) Notice: Subject to any disclaimer, the term of this patent is extended or adjusted under 35 U.S.C. 154(b) by 304 days.

(21) Appl. No.: 12/984,117

(22) Filed: Jan. 4, 2011

(65) Prior Publication Data
US 2012/0174023 A1 Jul. 5, 2012

(51) Int. Cl.
G06F 3/048 (2013.01)
(52) U.S. Cl.
USPC ............ 715/835; 715/810; 715/833; 715/838
(58) Field of Classification Search
USPC ................. 715/833, 781, 810–832, 834–845
See application file for complete search history.

(56) References Cited

U.S. PATENT DOCUMENTS

| | | | | |
|---|---|---|---|---|
| 5,953,009 | A * | 9/1999 | Alexander | 715/771 |
| 6,032,678 | A * | 3/2000 | Rottem | 600/437 |
| 6,313,877 | B1 * | 11/2001 | Anderson | 348/333.05 |
| 6,463,428 | B1 * | 10/2002 | Lee et al. | 707/750 |
| 6,538,672 | B1 * | 3/2003 | Dobbelaar | 715/810 |
| 7,117,453 | B2 * | 10/2006 | Drucker et al. | 715/833 |
| 2002/0004813 | A1 | 1/2002 | Agrawal et al. | |
| 2002/0054158 | A1 * | 5/2002 | Asami | 345/838 |
| 2004/0141016 | A1 * | 7/2004 | Fukatsu et al. | 345/856 |
| 2004/0233238 | A1 * | 11/2004 | Lahdesmaki | 345/810 |
| 2005/0149880 | A1 * | 7/2005 | Postrel | 715/808 |
| 2006/0090141 | A1 * | 4/2006 | Loui et al. | 715/764 |
| 2006/0135859 | A1 * | 6/2006 | Iliff | 600/300 |
| 2007/0130537 | A1 | 6/2007 | Chiu | |
| 2008/0010585 | A1 | 1/2008 | Schneider et al. | |
| 2008/0163085 | A1 * | 7/2008 | Subbu et al. | 715/763 |
| 2010/0185984 | A1 * | 7/2010 | Wright et al. | 715/833 |
| 2010/0262514 | A1 | 10/2010 | Westphal | |
| 2012/0005045 | A1 * | 1/2012 | Baker | 705/27.2 |

OTHER PUBLICATIONS

Wikipedia, "Event (computing)", http://en.wikipedia.org/wiki/Event_(computing) from Internet Archive: http://web.archive.org/web/20101112225406/http://en.wikipedia.org/wiki/Event_(computing) dated Nov. 12, 2010, pp. 1-5.*
Ali Mesbah, Analysis and Testing of Ajax-based Single-page Web Applications, 2009, 208 pp., http://homepages.cwi.nl/~arie/phds/Mesbah.pdf.
Philip Glass, IBM glass engine, infinity edition, Dunvagen Punblishing, 2007, 3 pp., htts://www.philipglass.com/glassengine/.

* cited by examiner

*Primary Examiner* — Nicholas Augustine
*Assistant Examiner* — William Wong
(74) *Attorney, Agent, or Firm* — Patrick J. Daugherty; Driggs, Hogg, Daugherty & Del Zoppo Co., LPA (57) ABSTRACT

A single page multi-tier catalog browser interface page is presented in a view formatted in response to a selection of a primary filter. The view displays a graduated element for selecting a primary filter value, and a matrix of secondary filter Yes or No indicators, each associated with the graduated element primary filter values, the Yes indicators aligned with the primary and secondary filter values that match within at least one record in a catalog. Selection of a graduated element value causes aligned Yes matrix indicators to be presented as selectable first-click icons in the interface page. Selection of a first-click icon expands it into a tertiary sub-window within the interface page, wherein selection thereof effects a layered primary-secondary-tertiary value searching of the catalog. Each of the above is achieved without navigating the user away from the single interface page.

23 Claims, 6 Drawing Sheets

SINGLE PAGE MULTI-TIER CATALOG BROWSER

TECHNICAL FIELD

The present invention relates to systems and methods for browsing and returning search results from a catalogue database as filtered by range criteria.

BACKGROUND

In catalog browsing, a desired result may be found through a series of categorical searches of a hierarchy structure, each search typically narrowing by adding additional search criteria or limits, for example using multiple filters to progressively narrow or reduce results to an ultimate result. Catalog browsing enables search results to be retrieved from a single database as well as from other databases, sources, web pages, etc. Although many search mechanisms are known, finding a final result from a large universe of possibilities generally requires a large plurality of user inputs at each of a plurality of different browser result windows, and wherein a user may click through a large plurality of windows to end up at a browser window or web page far removed from where the user started. Presenting information during the searching and at a final, ultimate result presents complexities in smoothly guiding a user through each step or page of the process, in one aspect to prevent user confusion and dissatisfaction in finding a desired result, or in backing out of a search in order to start a new or different search.

BRIEF SUMMARY

In one embodiment, a method is provided for a single page multi-tier catalog browser. The method includes presenting a single interface page in an original view formatted in response to a selection of a primary filter by displaying a graduated element for selecting a primary filter value, and populating a matrix of Yes and No indicators each associated with the graduated element primary filter values and with secondary filters, the Yes indicators aligned with plurality filter value and secondary filters that match within at least one record in a catalog, the No indicators aligned with plurality filter values and secondary filters that do not match within any result of the catalog. In response to a user selecting one of the graduated element primary filter values, those Yes matrix indicators aligned with the selected value are presented as selectable first-click icons in the interface page. In response to the user selecting first-click icons, it is expanded into a tertiary sub-window within the interface page, the tertiary sub-window displaying data returned by a search of the catalog by the aligned primary filter value and the secondary filter, or one or more second-click thumbnail images of a data item of the catalog that is associated with the aligned primary filter value and the secondary filter. In response to an input by the user, the tertiary sub-window is closed and the user view returned to the interface page original view, wherein the user remains on the single interface page for each of the steps described above (presenting the page in the original view, presenting the Yes matrix indicators that are aligned with the selected primary filter value as the selectable first-click icon, expanding the selected first-click icon into the tertiary sub-window and closing the tertiary sub-window and returning to the original view).

In another embodiment, a computer system includes a processing unit, computer readable memory and a computer readable storage system. Program instructions on the computer readable storage system cause the processing unit to present a single interface page in an original view formatted in response to a selection of a primary filter by displaying a graduated element for selecting a primary filter value, and populating a matrix of Yes and No indicators, each associated with the graduated element primary filter values and with secondary filters, the Yes indicators aligned with plurality filter value and secondary filters that match within at least one record in a catalog, the No indicators aligned with plurality filter values and secondary filters that do not match within any result of the catalog. In response to a user selecting one of the graduated element primary filter values, those Yes matrix indicators aligned with the selected value are presented as selectable first-click icons in the interface page. In response to the user selecting first-click icons, it is expanded into a tertiary sub-window within the interface page, the tertiary sub-window displaying data returned by a search of the catalog by the aligned primary filter value and the secondary filter, or one or more second-click thumbnail images of a data item of the catalog that is associated with the aligned primary filter value and the secondary filter. In response to an input by the user, the tertiary sub-window is closed and the user view returned to the interface page original view, wherein the user remains on the single interface page for each of the steps described above (presenting the page in the original view, presenting the Yes matrix indicators that are aligned with the selected primary filter value as the selectable first-click icon, expanding the selected first-click icon into the tertiary sub-window and closing the tertiary sub-window and returning to the original view).

In another embodiment, a computer program product for a single page multi-tier catalog browser is provided, which has computer readable storage medium including program instructions to present a single interface page in an original view formatted in response to a selection of a primary filter by displaying a graduated element for selecting a primary filter value, and populating a matrix of Yes and No indicators, each associated with the graduated element primary filter values and with secondary filters, the Yes indicators aligned with plurality filter value and secondary filters that match within at least one record in a catalog, the No indicators aligned with plurality filter values and secondary filters that do not match within any result of the catalog. In response to a user selecting one of the graduated element primary filter values, those Yes matrix indicators aligned with the selected value are presented as selectable first-click icons in the interface page. In response to the user selecting first-click icons, it is expanded into a tertiary sub-window within the interface page, the tertiary sub-window displaying data returned by a search of the catalog by the aligned primary filter value and the secondary filter, or one or more second-click thumbnail images of a data item of the catalog that is associated with the aligned primary filter value and the secondary filter. In response to an input by the user, the tertiary sub-window is closed and the user view returned to the interface page original view, wherein the user remains on the single interface page for each of the steps described above (presenting the page in the original view, presenting the Yes matrix indicators that are aligned with the selected primary filter value as the selectable first-click icons, expanding the selected first-click icon into the tertiary sub-window and closing the tertiary sub-window and returning to the original view).

In another embodiment, a service provides for single page multi-tier catalog browsing by providing a computer infrastructure that presents a single interface page in an original view formatted in response to a selection of a primary filter by displaying a graduated element for selecting a primary filter value, and populating a matrix of Yes and No indicators, each associated with the graduated element primary filter values and with secondary filters, the Yes indicators aligned with plurality filter value and secondary filters that match within at least one record in a catalog, the No indicators aligned with plurality filter values and secondary filters that do not match within any result of the catalog. In response to a user selecting one of the graduated element primary filter values, those Yes matrix indicators aligned with the selected value are presented as selectable first-click icons in the interface page. In response to the user selecting first-click icons, it is expanded into a tertiary sub-window within the interface page, the tertiary sub-window displaying data returned by a search of the catalog by the aligned primary filter value and the secondary filter, or one or more second-click thumbnail images of a data item of the catalog that is associated with the aligned primary filter value and the secondary filter. In response to an input by the user, the tertiary sub-window is closed and the user view returned to the interface page original view, wherein the user remains on the single interface page for each of the steps described above (presenting the page in the original view, presenting the Yes matrix indicators that are aligned with the selected primary filter value as the selectable first-click icons, expanding the selected first-click icon into the tertiary sub-window and closing the tertiary sub-window and returning to the original view).

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium excludes transitory, propagation or carrier wave signals or subject matter and includes an electronic, magnetic, optical, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that does not propagate but can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk®, C++ or the like and conventional procedural programming languages, such as the "C" programming language or similar programming languages. (ORACLE and JAVA are registered trademarks of Oracle and/or its affiliates in the United States or other countries; SMALLTALK is a registered trademark of Infone Tech, Ltd. in the United States or other countries.) The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
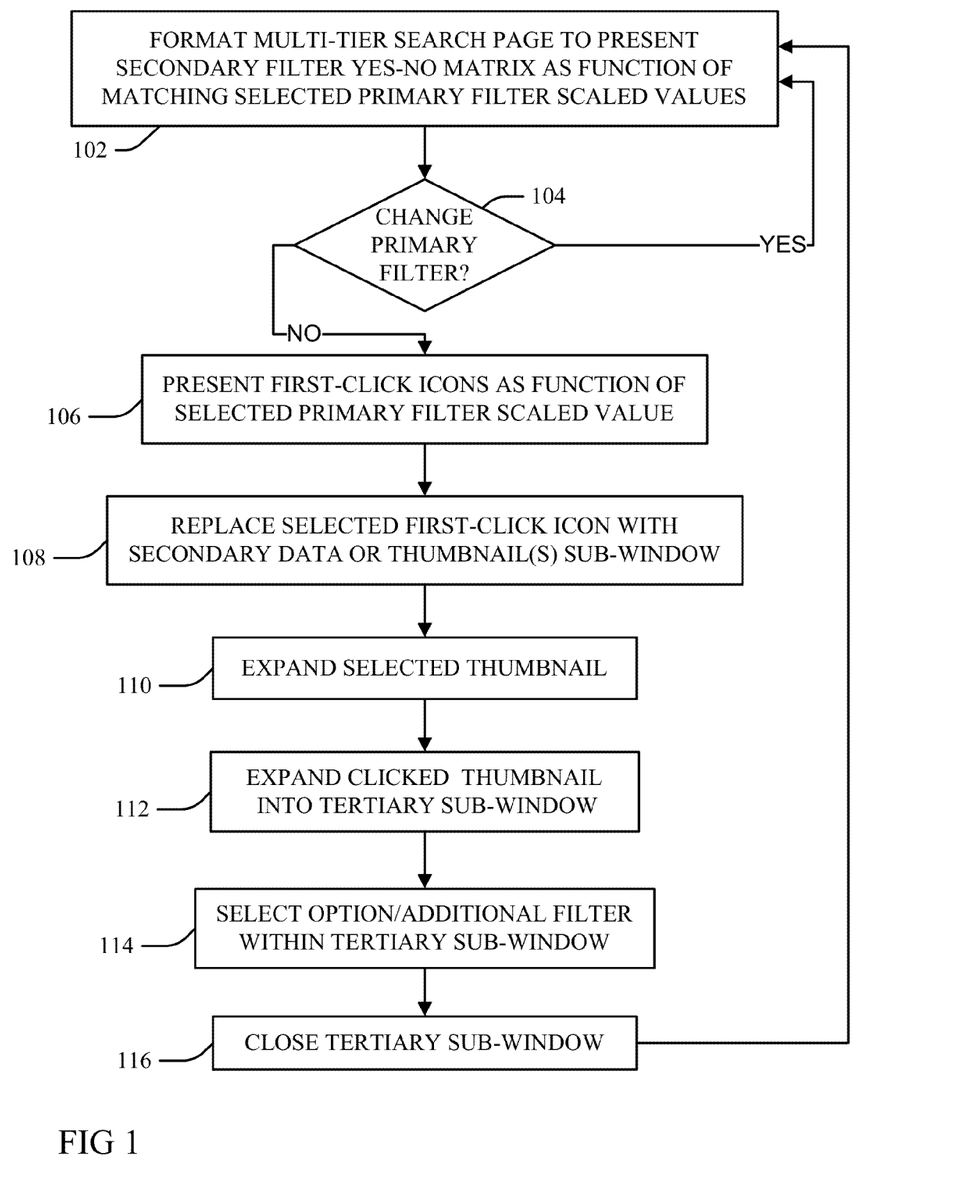
FIG. 1 is a diagrammatic illustration of an embodiment of a system, method or process according to the present invention for a single page multi-tier catalog browser.

FIG. 1 is a block diagram illustration of a process or system for single page catalog browsing of a plurality of catalog entries according to the present invention. At 102 a single-page multi-tier catalog browsing interface is presented to a user formatted in response to a user selection of one of a plurality of pre-determined, primary filter (or filtering criteria), wherein a plurality of secondary criteria filters are selected and presented to the user as a function of the selected primary filter to complement and modify the selected primary filter, in one aspect to provide a focused narrowing item search of the catalog. More particularly, a multi-tier catalog browsing interface web page is displayed at 102 comprising a plurality of primary criteria filter values in a sliding scale (or other graduated, selectable element) in a Yes-or-No matrix relationship with a plurality of different secondary criteria filters. The matrix is populated with binary value Yes-No indicators that are each aligned with the primary criteria sliding scale values as a function of matching ("Yes") or not-matching ("No") respective aligned ones of the secondary criteria within at least one catalog result. The page enables the user to select one of the secondary criteria as an additional search filter through a graphical user interface (GUI) selection of a corresponding "Yes" indicator. The page also continues to present the original primary criteria choices at 102, and at each subsequent presentation or redrawing of the page, during which enables the user to change the primary filter selection at 104 at any time to trigger a responsive reformatting of the page by generating another Yes-No matrix at 102 as a function of each respective primary filter selection.

At 106, in response to a user selecting one of the primary criteria values in the sliding scale, the single-page multi-tier catalog browsing interface presents those "Yes" matrix value indicators associated with the selected primary criteria value as selectable first-click icons. These may also be distinguished visually from the other "Yes" matrix value indicators remaining in the matrix, in order to quickly visually indicate to the user the "Yes" secondary criteria values that are associated with the selected primary filter value as distinguished from the other "Yes" indicators, but this is optional.

In response to the user selecting a first-click icon at 108, for example by rolling a cursor or other GUI element over the selected first-click icon and/or clicking a mouse button or entering some other selection input through the GUI, the catalog browsing interface replaces (or expands) the selected first-click icon with (or into) a sub-window within the same, single-page view of the browsing interface which displays (1) data returned by a catalog search result returned by the aligned primary and secondary criteria; (2) a single second-click thumbnail image of a single catalog item associated with the aligned primary and secondary criteria; or (3) a genus group of species second-click thumbnail images of catalog items, each associated with the aligned primary and secondary criteria.

At 110, some embodiments of the present invention enable a user to expand each of the displayed second-click thumbnails by rolling over the GUI cursor, thereby enlarging them temporarily for better viewing while the cursor is located over each respective enlarged thumbnail. However, this is optional, and some embodiments may convey sufficient information by a non-expanding second-click thumbnail to enable a choice by the user. At 112, in response to the user clicking on a one of the second-click thumbnails, the browsing interface expands the selected and clicked thumbnail into a (or opens a new) tertiary product/data detail window with options selectable by the user with respect to a catalog item result wherein the opened/new tertiary window is a sub-window within the original single-page multi-tier catalog browsing interface window presented at 102.

The tertiary sub-window may provide discrete additional selectable filtering options selectable at 114, for example to select an item from a tertiary genus group of items represented by the tertiary sub-window by a fourth-level color, species identity, model number, prices, etc., filter option, and wherein this process may iteratively repeat to redraw the tertiary sub-window for each additional filter option chosen at a fifth, sixth, etc. level, until a final result is selected within the tertiary sub-window iterations at 114. The discrete additional selectable tertiary sub-window options at 114 may also comprise actions available to the user with respect to the tertiary sub-window or catalog item retrieved thereby, for example buttons to effect printing an item, purchasing an item, reporting an item or event, etc.).

At 116, the user closes the tertiary sub-window (through executing one of the options in the detail window or otherwise exercising a close window option), which returns the user's view to the original single-page multi-tier catalog browsing interface window drawn in response to the selected primary criteria at 102 for more browsing, or for redrawing by selecting a new primary criteria at 102-104, etc.

In one aspect, in the process of FIG. 1 described above, the user never leaves the single-page multi-tier catalog browsing interface view. Thus, where a group of thumbnails are presented at 108, choosing one of the thumbnails over the others is a tertiary, third filtering of the catalog records to return the chosen thumbnail as a search result without requiring the user to navigate to a different window or web page. In effect, the first and second click selections at 108 and 112, respectively, create a search term with the primary and secondary (and optionally with tertiary and more filters by thumbnail selection at 112 and option selections at 114) for searching and returning a catalog item as a function of their coexistence within a chosen catalog entry.

FIGS. 2 through 7 illustrate embodiments of a single-page multi-tier catalog browsing interface web page views according to the present invention. It will be understood that each of FIGS. 2-7 present views of all or portions of a singular, over-all window frame presented to the user, the page or elements of it redrawn as necessary, but wherein the user never navigates away from the page or leaves the over-all window frame of the presented page.

Figure 2:
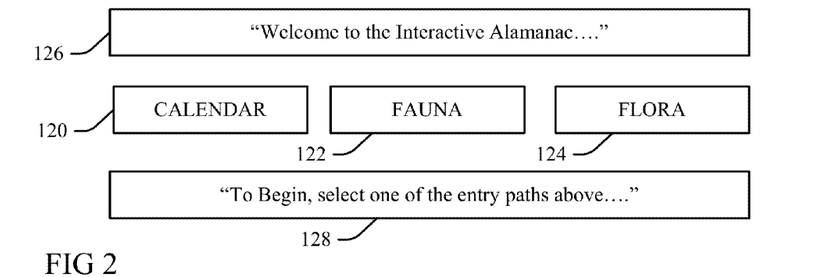
FIG. 2 is a diagrammatic illustration of an embodiment of a single page view of a multi-tier catalog browser according to the present invention.
Figure 3:
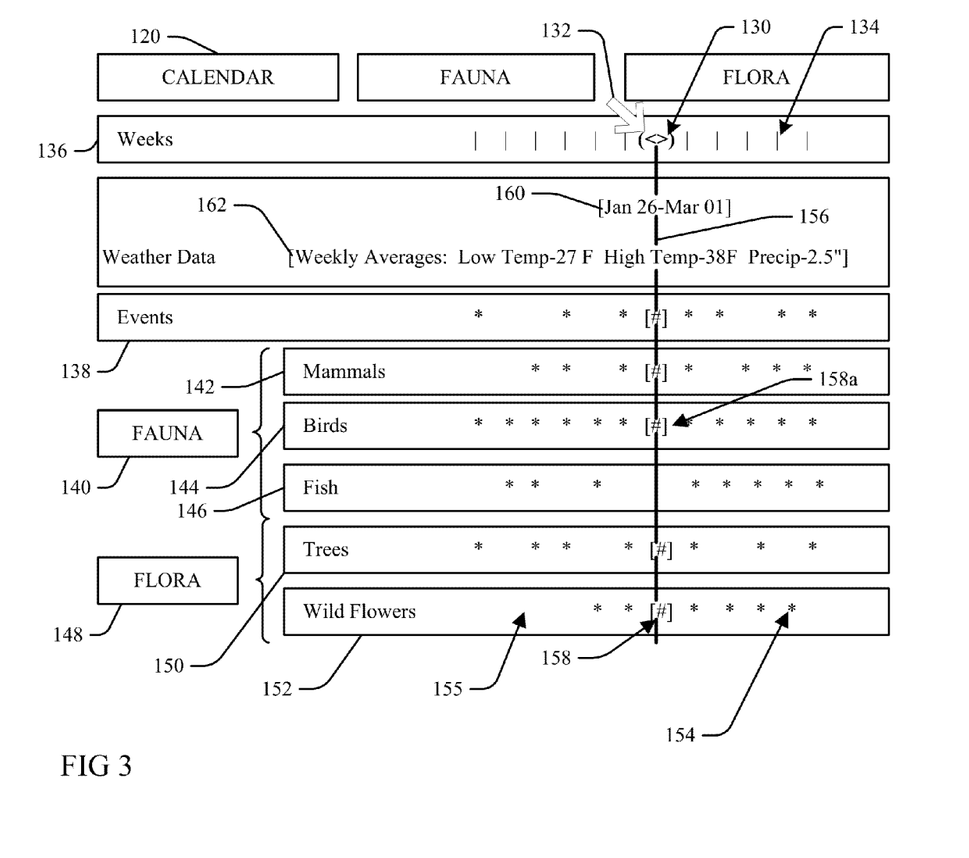
FIG. 3 is a diagrammatic illustration of another format or view of the single page multi-tier catalog browser of FIG. 2.

FIG. 2 illustrates an optional greeting page format wherein a plurality of pre-determined, primary filtering criteria are presented for selection as Calendar 120, Fauna 122 and Flora 124 GUI buttons with respect to an almanac catalog. Optional information fields may also be included, for example a welcome banner field 126 and an explanatory field 128 to provide guidance to a user to select one of the primary filters 120, 122, or 124 and offer additional information. Alternative embodiments may also omit the greeting page format of FIG. 2 and format the page based on a default or prior selection of one of the criteria, as discussed more generally below. It will also be understood that additional page elements may be included in a single page view, in this Figure and in FIGS. 3 through 7 described below.

FIGS. 3 through 6 illustrate the single-page multi-tier catalog browsing interface page drawn upon selection of the Calendar primary filter button 120 by the user (or by default, prior choice history, etc.). The page provides a scale slider 130 movable by a GUI cursor 132 to select a primary filter value 134 on a sliding scale 136, in the present example to select a week of possible calendar weeks. A matrix of "Yes" asterisks 154 and "No" blank spaces 155 is provided indicating matches or the absence of matches in catalog records respectively for each week value 134 within the catalog records with respect to the listed secondary criteria Events 138, genus categories Fauna 140 and Flora 148 and their respective family or species sub-categories Mammals 142, Birds 144, Fish 146, Trees 150 and Wild Flowers 152.

In response to the user sliding the slider 130 onto one of the primary filter values 134, "Yes" binary indicators 154 aligned with the slider 130 through a slider bar 156 are reformatted into selectable first-click icons "[#]"158. The present embodiment also displays the week value selected 160, as well as weather data 162 associated with the primary criteria value independent of the secondary criteria (thus, data searchable and returnable from the catalog records from the primary criteria values only).

Figure 4:
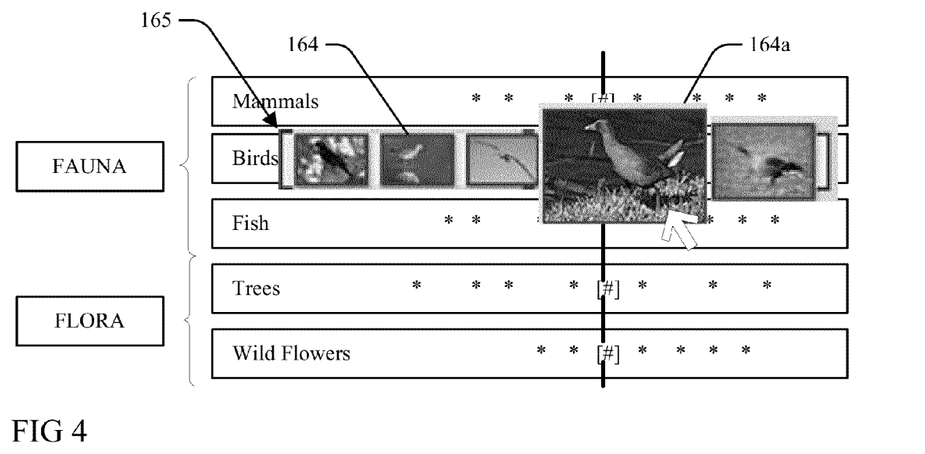
FIG. 4 is a diagrammatic illustration of another format or view of the single page multi-tier catalog browser of FIGS. 2 and 3.

FIG. 4 illustrates a result from the user navigating the cursor 132 over the first-click icon 158 aligned with the slider bar 156 in the Bird subcategory 144 and clicking on the first-click icon 158, which causes the single page to present a group of selectable second-click thumbnails 164 to the user in the same page within a horizontal thumbnail space 165 and in replacement of the clicked icon 158. If a total number of thumbnails 164 results contains more choices than will fit in an allocated horizontal thumbnail space 165, arrows may be provided to enable right/left scrolling of a slideshow presentation of the thumbnail 164 images within the horizontal thumbnail space 165.

Rolling the cursor 132 over any of the thumbnails 164 may optionally enlarge it temporarily for better viewing or to otherwise provide more information to the user as to the thumbnail 164, for example expanding the Goose Billed Thrasher thumbnail 164*a*.

Figure 5:
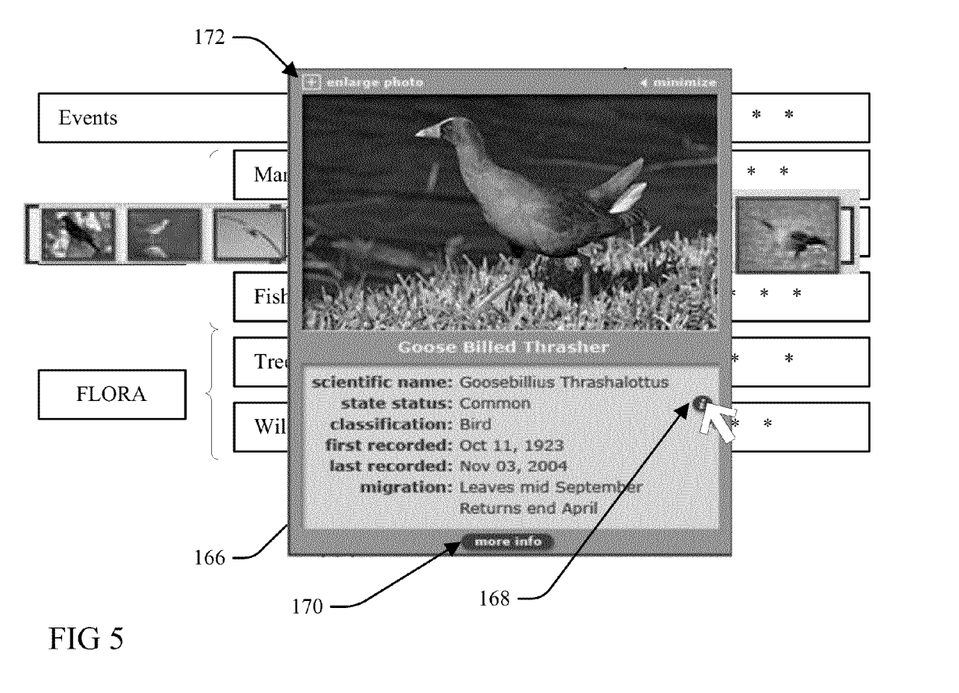
FIG. 5 is a diagrammatic illustration of another format or view of the single page multi-tier catalog browser of FIGS. 2, 3 and 4.

FIG. 5 illustrates the result of the user selecting the second-click Goose Billed Thrasher thumbnail 164*a* by clicking on it, resulting in a tertiary sub-window 166 presented to the user within an over-all window frame of the same presented page, and providing third level filter or action options selectable by the cursor 132; a detailed information button "i" 168, a different information option 170 and an optional enlarge window action 172.

Thus, according to the present invention, selection of a graduated element primary filter value causes aligned Yes matrix indicators to be presented as selectable first-click icons in the interface page, with selection thereof expanding a first-click icon into a tertiary sub-window within the interface page, and wherein a corresponding selection thereof may effect layered primary-secondary-tertiary value searching of the catalog and returning of a search result to the user, all without the user navigating away from the single interface page.

Figure 6:
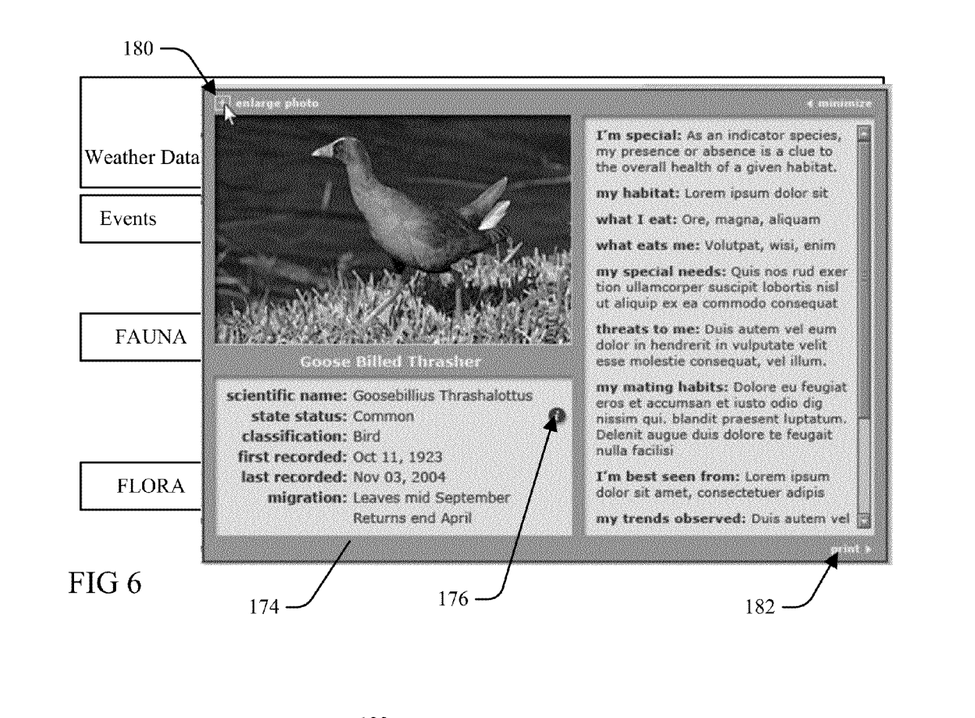
FIG. 6 is a diagrammatic illustration of another format or view of the single page multi-tier catalog browser of FIGS. 2, 3, 4 and 5.

For example, FIG. 6 illustrates the result of the user selecting the detailed information button "i" 168 within the tertiary window 166 of FIG. 5, resulting in a new more detailed tertiary level sub-window 174 comprising the detailed information and replacing the tertiary sub-window 166. In one aspect, the tertiary level sub-window 174 comprises catalog data retrieved through a search driven by a four-level filter search of filters selected by the user: the primary filter calendar week value 134, the first-click Fauna-Bird genus/species icon 158*a*, the second-click Goose Billed Thrasher thumbnail species 164*a*, and its associated detailed information button "i" 168. This detail window embodiment also provides another, further level of information search filtering in the form of a selectable "common" state status icon 176, as well as print window 182 and enlarge window 180 action options. Further, although the present embodiments illustrate image file data as conveyed by the thumbnails 164, 166 and 174, thumbnail embodiments according to the present invention may also present other forms of media and actions as well, for example to display or download files, video, animation, play audio stream, etc.

Figure 7:
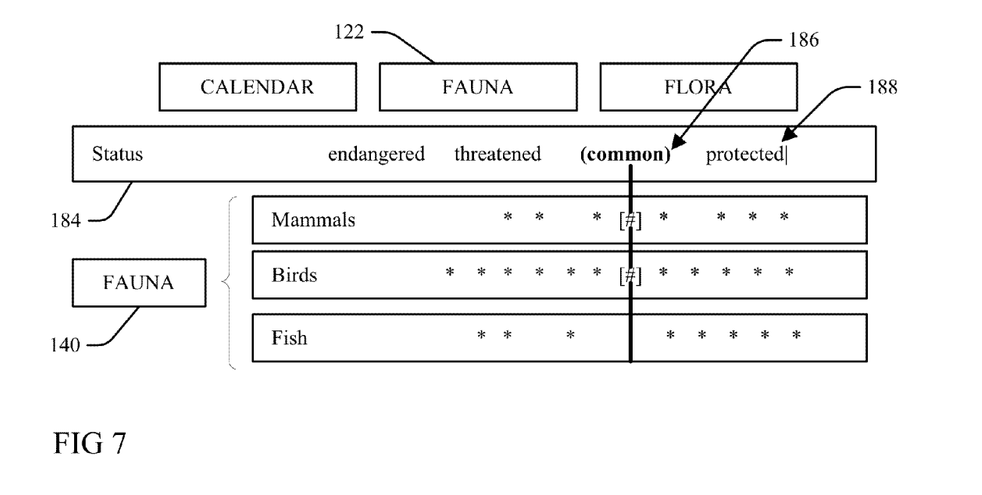
FIG. 7 is a diagrammatic illustration of another format or view of the single page multi-tier catalog browser of FIGS. 2, 3, 4, 5 and 6.

The user may also easily back out of the search or terminate it by closing the sub-windows 166 or 174, clicking another of the first-click icons 158, moving the slider 130 to create a new set of first-click icons 158 aligned with the slider 156, or by choosing another of the primary criteria options 122 or 124. For example, FIG. 7 shows a reformatting of the page in response to a selection of the Fauna primary criterion 122, wherein the page now provides a "Status" scale 184 slider 186 movable to select between different status values 188, in the present example. The matrix of "Yes" asterisks 154 and "No" blank spaces 156 now indicates matches or no-matches in Fauna genus 140 and sub-species/families Mammals 142, Birds 144, Fish 146 in the catalog records for respective status values 184, and wherein the Flora 148 and respective family/species sub-categories Trees 150 and Wild Flowers 152 are omitted.

More particularly, each of the search finish, back-out termination or primary criteria revision processes may be executed with the same, single over-all browser window or page view, without requiring the user to leave the original page view or successfully navigates through different page locations (or providers). Thus, in this and other embodiments, the present invention enables a user to efficiently achieve a desired search result, print found information, purchase a found item, etc., within a singular page view, reducing likelihood of user confusion that may occur as a result of navigating through multiple pages (and service providers) as is required in the prior. By avoiding different page navigation, the present embodiments avoid user confusion engendered by dealing with different formats, different service providers or different associated interaction requirements, thereby increasing the likelihood of successful results and item purchases relative to the prior art. For example, in a retail context, the thumbnails 164 and sub-windows 166 and 174 may provide product or item detail levels, and enable additional options (print, enlarge/rotate photo, email, add-to-cart, purchase, etc.) that may also enable transactional or non-transactional follow-on functionality, each without confusing the user or creating the possibility of mistakes through off-page navigation.

More particularly, in conventional, prior art catalog browsing, starting a new search or otherwise returning to an initial interface page or window may be inconvenient or confusing. Unwinding a prior art search result progression may require a large number of clicks to back out, or may require identifying and choosing an appropriate window from a large plurality of windows opened by the search, wherein selecting or closing the wrong window may cause the user to completely lose their way back to the original, starting search page, requiring a user to navigate back to the page and start over. As finding a final result is commonly a large number of pages or "clicks" away from an initial query (for example, between seven and ten in a retail context), user mistakes and confusion often lead to failure in smoothly navigating a retail site, leading to dissatisfaction with conventional catalog web sites and sometimes loss of customers and revenue, prior to a successful purchase execution. In contrast, embodiments of the present invention provide a single page, self-filtering visual interface paradigm that allows a user to browse and navigate to the desired product detail view in as little as two clicks (dependent upon the business rules in effect or assigned by a site owner). Users thus may act on their choice (complete a transaction or exit) and be back to the original interface without requiring any page navigation or navigational code-breaking.

Interface designs according to the present invention may be completely flexible in terms of assigned or chosen browsing filters and allow for categorical product/data hierarchies while giving the user the option of ignoring levels they aren't interested in viewing. Large product/data lists are easily viewable via expandable rollovers such that a great many items can be scanned quickly and in uncomplicated fashion. As such, user exploration enablement is optimized, increasing the chances of impulse purchases. By speeding up a shopping/transaction process (improving the customer experience), fatigue factor decreases while attention span increases, thus increasing the odds of a customer finishing a retail transaction and thereby the likelihood of increased revenue and customer retention.

Thus, in embodiments of the present invention, a single-page interface may be used for quickly browsing a catalogue database as filtered by any desirable, specified range criteria (for example, brand, article category, date, price, volume, ingredient, color, temperature, percentage metric, size, etc.) wherein a database may be tagged by a filter in a content management process which automatically creates Yes/No selectable icons in the single page interface. To facilitate great numbers of products or items, multiple layers of hierarchy may be included without complicating the user experience. Each tier within a page may be tagged to display unique content (example: featured products at the secondary level, category-specific products at tertiary level).

In one aspect, embodiments provide for a flexible and extensible, hierarchical self-filtering catalog browser that may present a global-to-micro view across an entire catalog in a single view. Prior art systems and methods, for example the IBM Philip Glass Engine require a slider or other selector item to be directly mapped to tags within each catalog result, and wherein the catalog items are limited in type to alike items that each meet all of the search criteria, they must have values for each search criteria. Such catalogs cannot be expanded to include other different items missing one or more tags or search criteria value, in one aspect as these items are not related to the existing catalog items. In contrast, embodiments of the present invention use layered filtering to add new or revised search criteria to thereby extend the catalog to different and optionally un-tagged items. Thus, the catalog searching enabled is not dependent on a limited catalog of similar or equivalent items specifically mapped and tagged, but wherein the catalog may be easily expanded in volume (in breadth and depth) to include large, perhaps unlimited, increments of dissimilar data items, with results returned easily and successfully through layered filtering.

Embodiments of the present invention may interface with a variety of catalog management software; illustrative but not exhaustive examples include Endeca® and WebSphere® content management software, and other examples will be apparent to one skilled in the art. (ENDECA is a trademark of Endeca Technologies, Inc., in the United States or other countries; WEBSPHERE is a trademark of IBM Corporation in the United States or other countries.) Embodiments of the present invention may be built for multiple display devices using multiple object-oriented programming languages, and the architecture may be device and language independent. In one example, a front end interface of the embodiments of FIGS. 2-7 was built using ActionScript® 3 and published as an Adobe Flash® file. (ACTIONSCRIPT and FLASH are trademarks of Adobe Systems Incorporated in the United States or other countries.) Although the present embodiments have been described with respect to internet and web applications, embodiments of the present invention may also be used for other display devices using other technologies (for example, cellular and mobile device displays, etc.). More particularly, embodiments of the present invention provide instrumented capabilities to enable multiple clients to feed data into the interface, for example, in content management systems, legacy data entry, mobile device applications. Such systems may be interconnected through web services connections and within intelligent frameworks implemented with custom code.

Figure 8:
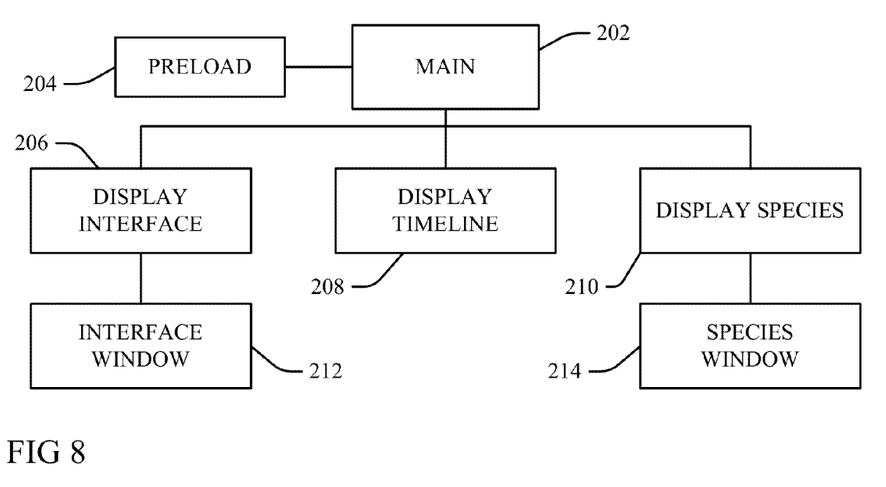
FIG. 8 is a diagrammatic illustration of an embodiment of a system, method or process according to the present invention for a single page multi-tier catalog browser.

For example, FIG. 8 illustrates one architecture example of the embodiment of FIGS. 2 through 7, wherein at 202, a main class instantiates the application, loads configuration variables and sets up an initial data load. At 204, a preload class loads formatted display data and associated media (for example, thumbnail images) into the application. Once the load at 204 is complete, the main class instantiates instances of the display interface 206, display timeline 208 and display species classes 210. The display interface 206 configures an interface layout based on variable data which can vertically contract or expand based on number of categories and number of child classifications within each category, and also horizontally contract or expand based on timeline measurement data. Thus, the display interface 206 creates an instance 212 of the interface window class which controls handling display of any interface data that may need to be turned on or off (pop up window, rollovers, help text, etc.) through display interface event listeners.

The appropriate primary criteria display filter (for example, a timeline or fauna status) configures the display and sliding selector controls based on the measurement data. For example, if the display data is filtered by number of weeks in a year, the display filter may display 52 data points for a given year in a horizontal timeline at 208 containing 52 points of data display control. Event listeners may be created to track user interaction with display filter interface controls.

The display content window (in the present example, species) 210 displays the categorized data as based on the timeline measurement data, for example the timeline matrix arrays of FIGS. 3-6 created to keep track of which category genus or species children are associated with each measured instance across the timeline 136. The content window class 214 thus controls handling display for each child object (text, images, video, etc.). It is noted that, depending on display types, additional subclasses may be created under a display content class; for example, if video were displayed for an instance of a category child display, then a display video class may be created to handle load, display and playback.

Figure 9:
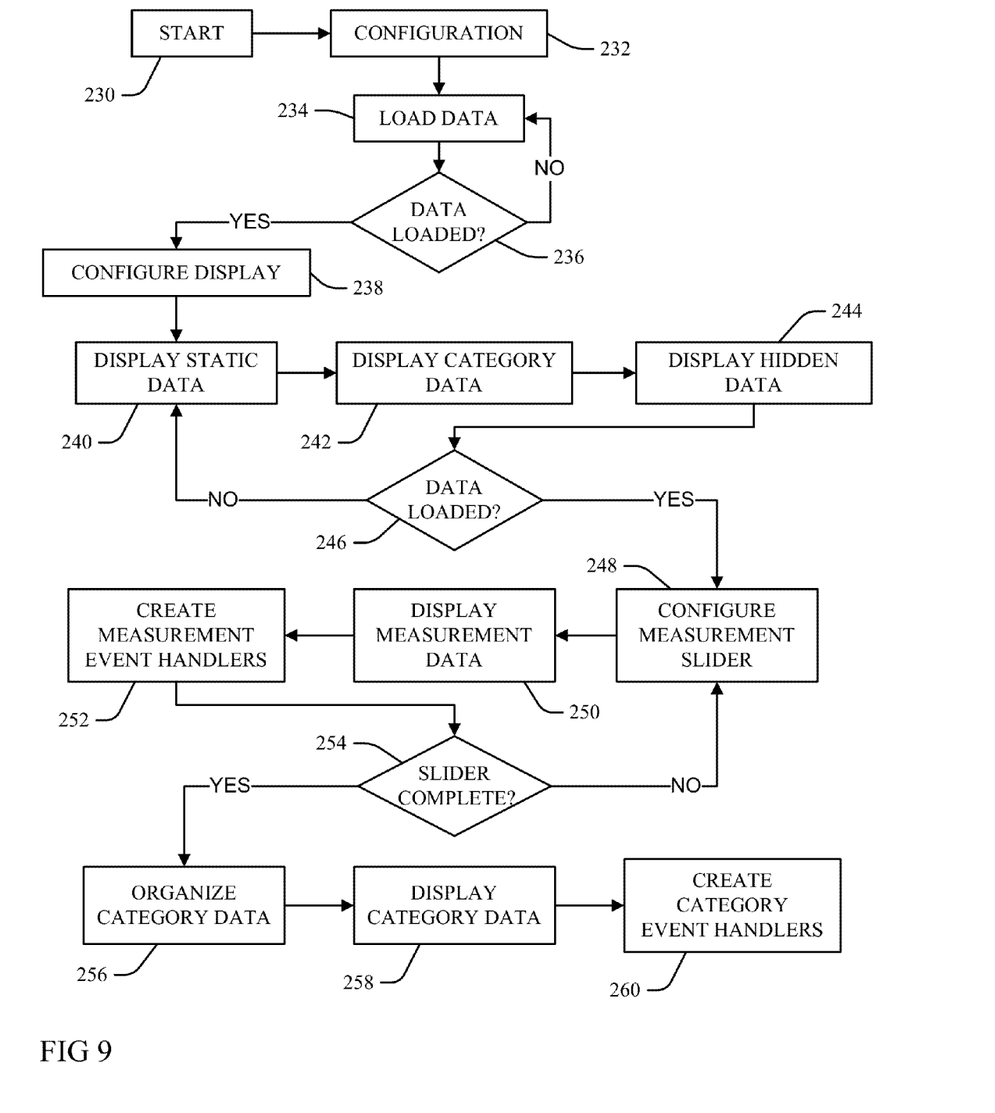
FIG. 9 is a diagrammatic illustration of an embodiment of a system, method or process according to the present invention for a single page multi-tier catalog browser.

FIG. 9 is a flow diagram illustrating an application flow of an embodiment of the present invention. At runtime start 230, a model application gathers client side configuration data at 232, and a client application loads static and dynamic display content data (text, media, etc.) from a server or other data source at 234. After an initial configuration and data load (as confirmed at 236), an application display view configures the display at 238, managing user interface, measurement controls (sliders, etc.) and category display views in the single-page interface, thereby displaying static data at 240, category data at 242 and hidden data at 244 (for example, detail sub-window 166 data summoned by selection of a first-click icon 158 and a second-click thumbnail 164).

Once the data is loaded at 246, each of the display views are created (interface, measurement controls, and category), event controllers are created to handle displaying/hiding static interface content or category data/media based upon user interaction, for example, by configuring a measurement slider at 248, displaying measurement data in association with the slider at 250 and creating measurement event handlers at 252 in an interactive process until the slider is complete at 254. Thus, category data is organized with respect to Yes or No indicators in a matrix relationship at 256, the category data matrix displayed at 258 and category event handlers created at 260.

Figure 10:
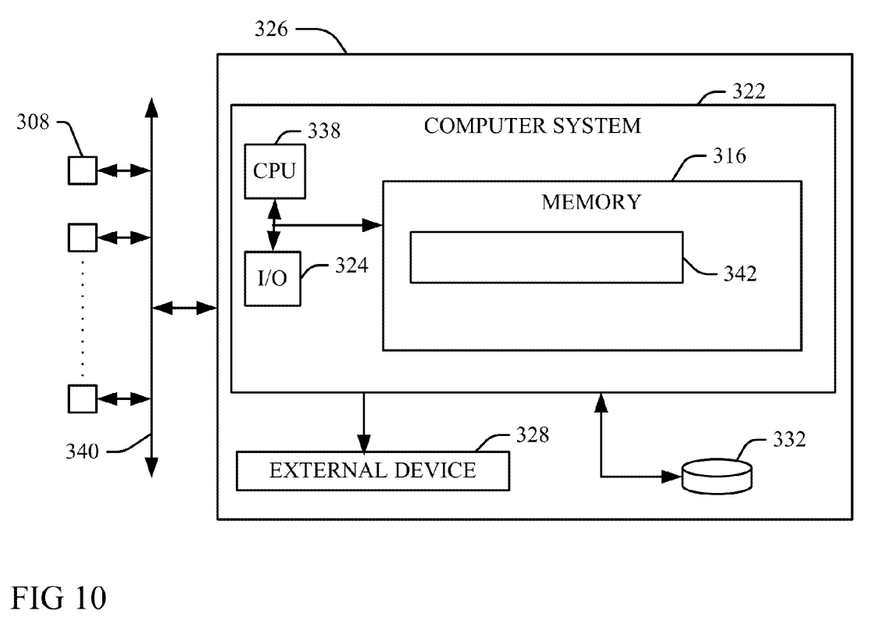
FIG. 10 is a diagrammatic illustration of a computerized implementation of an embodiment of the present invention.

Referring now to FIG. 10, an exemplary computerized implementation of an embodiment of the present invention includes client computer or other programmable device 322 in communication with one or more network servers 308, storage devices 332 or external devices 328, each of which may include third party servers accessible through an SSL or other secure web interface 340, for example in response to computer readable code 342 residing in a memory 316 or a storage system 332 through a computer network infrastructure 326. The implementation is intended to demonstrate, among other things, that the present invention could be implemented within a network environment (e.g., the Internet, a wide area network (WAN), a local area network (LAN) or a virtual private network (VPN), etc.) Communication can occur via any combination of various types of communications links: for example, communication links can comprise addressable connections that may utilize any combination of wired and/or wireless transmission methods.

Where communications occur via the Internet, connectivity could be provided by conventional TCP/IP sockets-based protocol, and an Internet service provider could be used to establish connectivity to the Internet. Still yet, the network infrastructure 326 is intended to demonstrate that an application of an embodiment of the invention can be deployed, managed, serviced, etc. by a service provider who offers to implement, deploy, and/or perform the functions of the present invention for others.

The computer 322 comprises various components, some of which are illustrated within the computer 322. More particularly, as shown, the computer 322 includes a processing unit (CPU) 338 in communication with the memory 316 and with one or more external Input/Output (I/O) devices/resources 324, external devices 328 and storage systems 332. In general, the processing unit 338 may execute computer program code 342, such as code to implement components that perform one or more of the process steps as illustrated in FIGS. 1, 8 and 9, or to provide the single-page browser pages illustrated by FIGS. 2-7, as discussed above. Said computer program code 342 may be stored in the memory 316, the storage device 332 and/or the external device 328.

The network infrastructure 326 is only illustrative of various types of computer infrastructures for implementing the invention. For example, in one embodiment, computer infrastructure 326 comprises two or more computing devices (e.g., a server cluster) that communicate over a network. Moreover, the computer 322 is only representative of various possible computer systems that can include numerous combinations of hardware. To this extent, in other embodiments, the computer 322 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Moreover, the processing unit 338 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations. Further, I/O interfaces 324 can comprise any system for exchanging information with one or more of the external device 328. Still further, it is understood that one or more additional components (e.g., system software, math co-processing unit, etc.), not shown, can be included in the computer 322.

One embodiment performs process steps of the invention on a subscription, advertising, and/or fee basis. That is, a service provider could offer to create, maintain, and support, etc., a computer infrastructure, such as the network computer infrastructure 326 that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for executing one or more of the processes, systems and articles according to the present invention as described above. In this case, a computer infrastructure, such as the computer infrastructure 326, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as the computers/devices 322, from a computer-readable medium; (2) adding one or more computing devices to the computer infrastructure; and (3) incorporating and/or modifying one or more existing systems of the computer infrastructure to enable the computer infrastructure to perform the process steps of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. As used herein, it is understood that the terms "program code" and "computer program code" are synonymous and mean any expression, in any language, code or notation, of a set of instructions intended to cause a computing device having an information processing capability to perform a particular function either directly or after either or both the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

Certain examples and elements described in the present specification, including in the claims and as illustrated in the Figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for a single page multi-tier catalog browser, the method comprising:
    presenting a single interface page in an original view that comprises a plurality of different selectable filtering criteria buttons that are each associated with different pre-determined filtering criteria relevant to a plurality of records within a catalog;
    in response to a user selection of a first one of the displayed filtering criteria buttons, redrawing the original view of the single interface web page into a second view that displays:
        a graduated element below the plurality of different selectable filtering criteria buttons that comprises a plurality of different values of a primary filter of the pre-determined filtering criteria that is associated with the selected first filtering criteria button;
        a matrix below the graduated element of a relationship of each of the displayed primary filter values to each of displayed ones of a plurality of different values of a secondary filter of the pre-determined filtering criteria that is associated with the selected first filtering criteria button, wherein the matrix is populated with a plurality of Yes indicators that are each aligned with respective ones of the displayed primary filter values and the displayed secondary filter values that match within the catalog records, and with a plurality of No indicators that are each aligned with respective ones of the displayed primary filter values and the displayed secondary filter values that do not match within the catalog records; and
        a slider bar engaging the graduated element that is movable via graphical user interface input by the user into different positions over each of the prima filter values displayed in the graduated element;
    in response to the user selecting one of the primary filter values displayed within the graduated element by moving the slider bar onto the selected primary filter value, presenting each of the Yes matrix indicators that are aligned with the selected primary filter value and displayed in the matrix in alignment with the slider bar in the second view as selectable icons in the interface web page;
    in response to the user selecting one of the selectable icons, redrawing the second view of the single interface web page into a third view expanding the selected icon into a sub-window within the interface web page, the sub-window displaying at least one thumbnail image of a data item of the catalog that is associated with the displayed primary filter value and the displayed secondary filter value that are each aligned in the displayed matrix with the selected icon;
    in response to the user selecting the at least one thumbnail image, redrawing the third view of the single interface web page into a fourth view enlarging the selected at least one thumbnail image into an expanded thumbnail window within the single interface web page, wherein the expanded thumbnail window comprises an additional filtering option that is selectable by the user; and
    in response to the user selecting the additional filtering option, redrawing the fourth view of the single interface web page into a fifth view expanding the expanded thumbnail window into a detail window that includes data returned from a search of the catalog records that is associated with the additional filtering option and the displayed primary filter value and the displayed secondary filter value that are each aligned in the displayed matrix with the selected icon; and
    wherein the user remains on the single interface web page during the presenting of the original view and during each of the redrawings of the first view, the second view, the third view, the fourth view and the fifth view, and in response to an input by the user closing any of the sub-window, the expanded thumbnail window and the detail window, without navigating away from the single interface web page to a different window or a different web page.

2. The method of claim 1, wherein the No indicators are blank spaces.

3. The method of claim 2, further comprising:
in response to a user selection of a different, second one of the displayed filtering criteria buttons, redrawing the interface web page into a sixth view by:
reformatting the graduated element to comprise a plurality of values of another primary filter of another one of the pre-determined filtering criteria that is associated with the selected second filtering criteria button; and
reformatting the matrix to display a relationship of each of the displayed primary filter values of the another primary filter to each of displayed ones of a plurality of values of another secondary filter of the other pre-determined filtering criteria that is associated with the selected second filtering criteria button, wherein the another matrix is populated with a plurality of Yes indicators that are each aligned with respective ones of the displayed primary filter values and the displayed secondary tilter values that match within the catalog records, and with a plurality of No indicators that are each aligned with respective ones of the displayed primary tilter values and the displayed secondary filter values that do not match within the catalog records;
wherein, in response to the user selecting one of the primary filter values displayed within the reformatted graduated element by moving the slider bar onto the selected primary filter value, the Yes matrix indicators that are aligned with the selected primary filter value displayed in the reformatted matrix in alignment with the slider bar are presented as reformatted matrix selectable icons in the interface web page that when selected expand into reformatted matrix sub-windows displaying at least one reformatted matrix thumbnail image of a data item of the catalog that is associated with the displayed primary filter value and the displayed secondary filter value that are each aligned in the displayed reformatted matrix with the selected icon within the second view of the interface web page; and
wherein the user remains on the single interface web page during each of the redrawing steps that generate the original view, the first view, the second view, the third view, the fourth view, the fifth view and the sixth view, and in response to an input by the user closing any of the sub-window, the expanded thumbnail window and the detail window, without navigating away from the single interface web page to a different window or a different web page.

4. The method of claim 3, wherein the at least one thumbnail image is a row of a plurality of thumbnails in a horizontal thumbnail space.

5. The method of claim 3, further comprising:
creating event listeners; and
tracking interaction of the user with display filter interface controls through the created event listeners.

6. The method of claim 5, further comprising:
creating interface, measurement control, and category event controllers to handle displaying and hiding static interface content in response to the user selecting the primary filter values displayed in the graduated element and the reformatted graduated element.

7. A system, comprising:
a processing unit, in communication with a computer readable memory and a tangible computer-readable storage medium;
wherein the processing unit, when executing program instructions stored on the tangible computer-readable storage medium via the computer readable memory;
presents a single interface page in an original view that comprises a plurality of different selectable filtering criteria buttons that are each associated with different pre-determined filtering criteria relevant to a plurality of records within a catalog;
in response to a user selection of a first one of the displayed filtering criteria buttons, redraws the original view of the single interface web page into a second view that displays:
a graduated element below the plurality of different selectable filtering criteria buttons that comprises a plurality of different values of a primary tilter of the pre-determined filtering criteria that is associated with the selected first filtering criteria button;
a matrix below the graduated element of a relationship of each of the displayed primary filter values to each of displayed ones of a plurality of different values of a secondary filter of the pre-determined filtering criteria that is associated with the selected first filtering criteria button, wherein the matrix is populated with a plurality of Yes indicators that are each aligned with respective ones of the displayed primary filter values and the displayed secondary filter values that match within the catalog records, and with a plurality of No indicators that are each aligned with respective ones of the displayed primary filter values and the displayed secondary filter values that do not match within the catalog records; and
a slider bar engaging the graduated element that is movable via graphical user interface input by the user into different positions over each of the primary filter values displayed in the graduated element;
in response to the user selecting one of the primary filter values displayed within the graduated element by moving the slider bar onto the selected primary filter value, presents each of the Yes matrix indicators that are aligned with the selected primary filter value and displayed in the matrix in alignment with the slider bar in the second view as selectable icons in the interface web page;
in response to the user selecting one of the selectable icons, redraws the second view of the single interface web page into a third view expanding the selected icon into a sub-window within the interface web page, the sub-window displaying at least one thumbnail image of a data item of the catalog that is associated with the displayed primary filter value and the displayed secondary filter value that are each aligned in the displayed matrix with the selected icon;
in response to the user selecting the at least one thumbnail image, redraws the third view of the single interface web page into a fourth view that enlarges the selected at least one thumbnail image into an expanded thumbnail window within the single interface web page, wherein the expanded thumbnail window comprises an additional filtering option that is selectable by the user; and
in response to the user selecting the additional filtering option, redraws the fourth view of the single interface web page into a fifth view that expands the expanded thumbnail window into a detail window that includes data returned from a search of the catalog records that is associated with the additional filtering option and the displayed primary filter value and the displayed secondary filter value that are each aligned in the displayed matrix with the selected icon; and wherein the user remains on the single interface web page during the presenting of the original view and during each of the redrawings of the first view, the second view, the third view, the fourth view and the fifth view, and in response to an input by the user closing any of the sub-window, the expanded thumbnail window and the detail window, without navigating away from the single interface web page to a different window or a different web page.

8. The system of claim 7, wherein the No indicators are blank spaces.

9. The system of claim 7, wherein the processing unit, when executing the program instructions stored on the computer-readable storage medium via the computer readable memory, further:

in response to a user selection of a different, second one of the displayed filtering criteria buttons, redraws the interface web page into a sixth view that comprises:

a reformatted graduated element that comprises a plurality of values of another primary filter of another one of the pre-determined filtering criteria that is associated with the selected second filtering criteria button; and a reformatted matrix that displays a relationship of each of the displayed primary filter values of the another primary filter to each of displayed ones of a plurality of values of another secondary filter of the other pre-determined filtering criteria that is associated with the selected second filtering criteria button, wherein the another matrix is populated with a plurality of Yes indicators that are each aligned with respective ones of the displayed primary filter values and the displayed secondary filter values that match within the catalog records, and with a plurality of No indicators that are each aligned with respective ones of the displayed primary filter values and the displayed secondary filter values that do not match within the catalog records;

wherein, in response to the user selecting one of the primary filter values displayed within the reformatted graduated element by moving the slider bar onto the selected primary filter value, the Yes matrix indicators that are aligned with the selected primary tilter value displayed in the reformatted matrix in alignment with the slider bar are presented as reformatted matrix selectable icons in the second view of interface web page that when selected expand into reformatted matrix sub-windows displaying at least one reformatted matrix thumbnail image of a data item of the catalog that is associated with the displayed primary filter value and the displayed secondary filter value that are each aligned in the displayed reformatted matrix with the selected icon within the second view of the interface web page; and wherein the user remains on the single interface web page during each of the redrawing steps that generate the original view, the first view, the second view, the third view, the fourth view, the fifth view and the sixth view, and in response to an input by the user closing any of the sub-window, the expanded thumbnail window and the detail window, without navigating away from the single interface web page to a different window or a different web page.

10. The system of claim 9, wherein the processing unit, when executing the program instructions stored on the computer-readable storage medium via the computer readable memory, further presents the at least one thumbnail image as a row of a plurality of thumbnails in a horizontal thumbnail space.

11. The system of claim 9, wherein the processing unit, when executing the program instructions stored on the computer-readable storage medium via the computer readable memory, further:

creates event listeners; and tracks interaction of the user with display filter interface controls through the created event listeners.

12. The system of claim 11, wherein the processing unit, when executing the program instructions stored on the computer-readable storage medium via the computer readable memory, further creates interface, measurement control, and category event controllers to handle displaying and hiding static interface content in response to the user selecting primary filter values through the graduated element and the reformatted graduated element.

13. A computer program product for a single page multi-tier catalog browser, the computer program product comprising:

a tangible computer readable storage medium having computer readable program code embodied therewith, the computer readable program code comprising instructions that, when executed by a computer processing unit, cause the computer processing unit to:

present a single interface page in an original view that comprises a plurality of different selectable filtering criteria buttons that are each associated with different pre-determined filtering criteria relevant to a plurality of records within a catalog;

in response to a user selection of a first one of the displayed filtering criteria buttons, redraw the original view of the single interface web page into a second view that displays:

a graduated element below the plurality of different selectable filtering criteria buttons that comprises a plurality of different values of a primary filter of the pre-determined filtering criteria that is associated with the selected first filtering criteria button;

a matrix below the graduated element of a relationship of each of the displayed primary filter values to each of displayed ones of a plurality of different values of a secondary filter of the pre-determined filtering criteria that is associated with the selected first filtering criteria button, wherein the matrix is populated with a plurality of Yes indicators that are each aligned with respective ones of the displayed primary filter values and the displayed secondary tilter values that match within the catalog records, and with a plurality of No indicators that are each aligned with respective ones of the displayed primary filter values and the displayed secondary filter values that do not match within the catalog records; and a slider bar engaging the graduated element that is movable via graphical user interface input by the user into different positions over each of the primary filter values displayed in the graduated element;

in response to the user selecting one of the primary filter values displayed within the graduated element by moving the slider bar onto the selected primary filter value, present each of the Yes matrix indicators that are aligned with the selected primary filter value and displayed in the matrix in alignment with the slider bar in the second view as selectable icons in the interface web page;

in response to the user selecting one of the selectable icons, redraw the second view of the single interface web page into a third view expanding the selected icon into a sub-window within the interface web page, the sub-window displaying at least one thumbnail image of a data item of the catalog that is associated with the displayed primary filter value and the displayed secondary filter value that are each aligned in the displayed matrix with the selected icon;

in response to the user selecting the at least one thumbnail image, redraw the third view of the single interface web page into a fourth view that enlarges the selected at least one thumbnail image into an expanded thumbnail window within the single interface web page, wherein the expanded thumbnail window comprises an additional filtering option that is selectable by the user; and in response to the user selecting the additional filtering option, redraw the fourth view of the single interface web page into a fifth view that expands the expanded thumbnail window into a detail window that includes data returned from a search of the catalog records that is associated with the additional filtering option and the displayed primary filter value and the displayed secondary filter value that are each aligned in the displayed matrix with the selected icon; and wherein the user remains on the single interface web page during the presenting of the original view and during each of the redrawings of the first view, the second view, the third view, the fourth view and the fifth view, and in response to an input by the user closing any of the sub-window, the expanded thumbnail window and the detail window, without navigating away from the single interface web page to a different window or a different web page.

14. The computer program product of claim 13, wherein the No indicators are blank spaces.

15. The computer program product of claim 14, wherein the computer readable program code instructions, when executed by the computer processing unit, further cause the computer processing unit to:

in response to a user selection of a different, second one of the displayed filtering criteria buttons, redraw the interface web page into a sixth view that comprises:

a reformatted graduated element that comprises a plurality of values of another primary filter of another one of the pre-determined filtering criteria that is associated with the selected second filtering criteria button; and a reformatted matrix that displays a relationship of each of the displayed primary filter values of the another primary filter to each of displayed ones of a plurality of values of another secondary filter of the other pre-determined filtering criteria that is associated with the selected second filtering criteria button, wherein the another matrix is populated with a plurality of Yes indicators that are each aligned with respective ones of the displayed primary filter values and the displayed secondary filter values that match within the catalog records, and with a plurality of No indicators that are each aligned with respective ones of the displayed primary filter values and the displayed secondary filter values that do not match within the catalog records;

wherein, in response to the user selecting one of the primary filter values displayed within the reformatted graduated element by moving the slider bar onto the selected primary filter value, the Yes matrix indicators that are aligned with the selected primary filter value displayed in the reformatted matrix in alignment with the slider bar are presented as reformatted matrix selectable icons in the second view of interface web page that when selected expand into reformatted matrix sub-windows displaying at least one reformatted matrix thumbnail image of a data item of the catalog that is associated with the displayed primary filter value and the displayed secondary filter value that are each aligned in the displayed reformatted matrix with the selected icon within the second view of the interface web page; and wherein the user remains on the single interface web page during each of the redrawing steps that generate the original view, the first view, the second view, the third view, the fourth view, the fifth view and the sixth view, and in response to an input by the user closing any of the sub-window, the expanded thumbnail window and the detail window, without navigating away from the single interface web page to a different window or a different web page.

16. The computer program product of claim 15, wherein the computer readable program code instructions, when executed by the computer processing unit, further cause the computer processing unit to:

create event listeners; and track interaction of the user with display filter interface controls through the created event listeners.

17. The computer program product of claim 16, wherein the computer readable program code instructions, when executed by the computer processing unit, further cause the computer processing unit to create interface, measurement control, and category event controllers to handle displaying and hiding static interface content in response to the user selecting primary filter values through the graduated element and the reformatted graduated element.

18. A method for providing a service for single page multi-tier catalog browsing, the method comprising:

implementing computer-readable program code into a computer system comprising a processing unit, a computer readable memory and a computer readable tangible storage medium, wherein the computer readable program code is embodied on the computer readable tangible storage medium and comprises instructions that, when executed by the processing unit via the computer readable memory, cause the processing unit to:

present a single interface page in an original view that comprises a plurality of different selectable filtering criteria buttons that are each associated with different pre-determined filtering criteria relevant to a plurality of records within a catalog;

in response to a user selection of a first one of the displayed filtering criteria buttons, redraw the original view of the single interface web page into a second view that displays:

a graduated element below the plurality of different selectable filtering criteria buttons that comprises a plurality of different values of a primary filter of the pre-determined filtering criteria that is associated with the selected first filtering criteria button;

a matrix below the graduated element of a relationship of each of the displayed primary filter values to each of displayed ones of a plurality of different values of a secondary filter of the pre-determined filtering criteria that is associated with the selected first filtering criteria button, wherein the matrix is populated with a plurality of Yes indicators that are each aligned with respective ones of the displayed primary filter values and the displayed secondary filter values that match within the catalog records, and with a plurality of No indicators that are each aligned with respective ones of the displayed primary filter values and the displayed secondary filter values that do not match within the catalog records; and a slider bar engaging the graduated element that is movable via graphical user interface input by the user into different positions over each of the primary filter values displayed in the graduated element;

in response to the user selecting one of the primary filter values displayed within the graduated element by moving the slider bar onto the selected primary filter value, present each of the Yes matrix indicators that are aligned with the selected primary filter value and displayed in the matrix in alignment with the slider bar in the second view as selectable icons in the interface web page;

in response to the user selecting one of the selectable icons, redraw the second view of the single interface web page into a third view expanding the selected icon into a sub-window within the interface web page, the sub-window displaying at least one thumbnail image of a data item of the catalog that is associated with the displayed primary filter value and the displayed secondary filter value that are each aligned in the displayed matrix with the selected icon;

in response to the user selecting the at least one thumbnail image, redraw the third view of the single interface web page into a fourth view that enlarges the selected at least one thumbnail image into an expanded thumbnail window within the single interface web page, wherein the expanded thumbnail window comprises an additional filtering option that is selectable by the user; and in response to the user selecting the additional filtering option, redraw the fourth view of the single interface web page into a fifth view that expands the expanded thumbnail window into a detail window that includes data returned from a search of the catalog records that is associated with the additional filtering option and the displayed primary filter value and the displayed secondary filter value that are each aligned in the displayed matrix with the selected icon; and wherein the user remains on the single interface web page during the presenting of the original view and during each of the redrawings of the first view, the second view, the third view, the fourth view and the fifth view, and in response to an input by the user closing any of the sub-window, the expanded thumbnail window and the detail window, without navigating away from the single interface web page to a different window or a different web page.

19. The method of claim 18, wherein the No indicators are blank spaces.

20. The method of claim 19, wherein the instructions, when executed by the processing unit via the computer readable memory, further cause the processing unit to:

in response to a user selection of a different, second one of the displayed filtering criteria buttons, redraw the interface web page into a sixth view that comprises:

a reformatted graduated element that comprises a plurality of values of another primary filter of another one of the pre-determined filtering criteria that is associated with the selected second filtering criteria button; and a reformatted matrix that displays a relationship of each of the displayed primary filter values of the another primary filter to each of displayed ones of a plurality of values of another secondary filter of the other pre-determined filtering criteria that is associated with the selected second filtering criteria button, wherein the another matrix is populated with a plurality of Yes indicators that are each aligned with respective ones of the displayed primary filter values and the displayed secondary filter values that match within the catalog records, and with a plurality of No indicators that are each aligned with respective ones of the displayed primary filter values and the displayed secondary filter values that do not match within the catalog records;

wherein, in response to the user selecting one of the primary filter values displayed within the reformatted graduated element by moving the slider bar onto the selected primary filter value, the Yes matrix indicators that are aligned with the selected primary filter value displayed in the reformatted matrix in alignment with the slider bar are presented as reformatted matrix selectable icons in the second view of interface web page that when selected expand into reformatted matrix sub-windows displaying at least one reformatted matrix thumbnail image of a data item of the catalog that is associated with the displayed primary filter value and the displayed secondary filter value that are each aligned in the displayed reformatted matrix with the selected icon within the second view of the interface web page; and wherein the user remains on the single interface web page during each of the redrawing steps that generate the original view, the first view, the second view, the third view, the fourth view, the fifth view and the sixth view, and in response to an input by the user closing any of the sub-window, the expanded thumbnail window and the detail window, without navigating away from the single interface web page to a different window or a different web page.

21. The method of claim 20, wherein the instructions, when executed by the processing unit via the computer readable memory, further cause the processing unit to present the at least one thumbnail image as a row of a plurality of thumbnails in a horizontal thumbnail space.

22. The method of claim 20, wherein the instructions, when executed by the processing unit via the computer readable memory, further cause the processing unit to:

create event listeners; and track interaction of the user with display filter interface controls through the created event listeners.

23. The method of claim 22, wherein the instructions, when executed by the processing unit via the computer readable memory, further cause the processing unit to create interface, measurement control, and category event controllers to handle displaying and hiding static interface content, in response to the user selecting primary filter values through the graduated element and the another graduated element.

* * * * *